C. SNODGRASS.
RIVETING MACHINE.
APPLICATION FILED JUNE 5, 1913.

1,089,281.

Patented Mar. 3, 1914.

WITNESSES

INVENTOR
Charley Snodgrass
BY
ATTORNEYS

UNITED STATES PATENT OFFICE.

CHARLEY SNODGRASS, OF LOS ANGELES, CALIFORNIA, ASSIGNOR OF ONE-FOURTH TO FRITZ KIEHN, ONE-FOURTH TO JULIUS ZAHL, AND ONE-FOURTH TO HEINRICH ILLETSCHKO, ALL OF LOS ANGELES, CALIFORNIA.

RIVETING-MACHINE.

1,089,281. Specification of Letters Patent. Patented Mar. 3, 1914.

Application filed June 5, 1913. Serial No. 772,013.

*To all whom it may concern:*

Be it known that I, CHARLEY SNODGRASS, a citizen of the United States, and a resident of Los Angeles, in the county of Los Angeles and State of California, have invented a new and Improved Riveting-Machine, of which the following is a full, clear, and exact description.

This invention relates to improvements in riveting machines, and has for an object to provide an improved structure which will evenly rivet or upset the end of a bolt, rivet, or other similar article with a minimum amount of noise.

Another object of the invention is to provide a rapidly rotating riveting head formed with rotating rollers acting as the contact members for performing the upsetting operation.

In carrying out the objects of the invention, a rivet head is provided, having a shank extending therefrom. The riveting head is formed so as to receive a plurality of rollers which in operation are pressed against the end of the rivet while the head is rotated rapidly. A shank extending from the rivet head is journaled in a suitable pressure member so as to reduce the friction to a minimum and allow ample pressure to be brought to bear for performing the riveting operation.

A practical embodiment of the invention is represented in the accompanying drawings forming a part of this specification in which similar characters of reference indicate corresponding parts in all the views.

Figure 1:
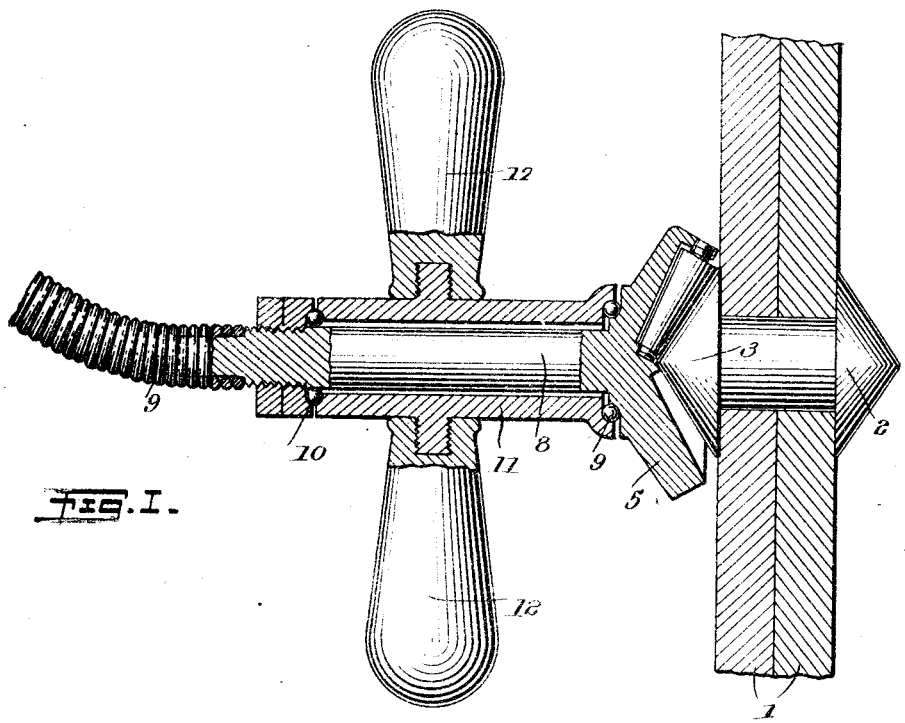
Figure 2:
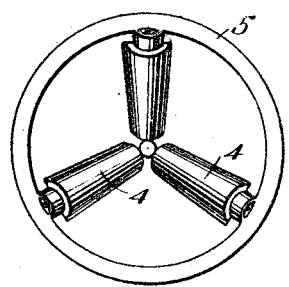
Figure 3:
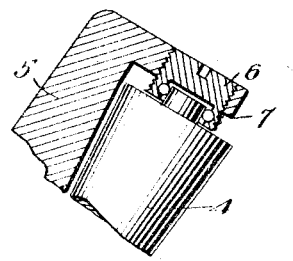

Figure 1 is a vertical longitudinal section through a machine or tool embodying the invention; Fig. 2 is an end view of the riveting head; and Fig. 3 is an enlarged detail fragmentary sectional view through the riveting head showing the support for one of the rollers.

Referring to the accompanying drawings by numerals, 1 indicates a pair of plates, and 2 a rivet. Arranged to rest upon head 3 of rivet 2 are a plurality of rollers 4, mounted in a head 5. Each of these rollers is provided with journal members at the inner end fitting into suitable bores in head 5, and journal members at the outer end fitting into screw plug 6 (Fig. 3) which carry antifriction rollers 7. The rollers 4 are preferably formed tapering from the outer end to the inner end and are properly inclined for providing a proper tapering head 3 on rivet 2 when used. The head 5 of the riveting machine or tool is provided with a shank 8 to which is secured a flexible driving member 9, designed to be driven from any desired source of power and at any speed, preferably at a high speed. Antifriction members 9 and 10 are used for journaling the shank 8 properly in place in the casing 11. The casing 11 is provided with pressure members 12. The pressure members 12 may be manually used whenever desired, or mechanical means may be used for pressing the same toward rivet 2. By this construction and arrangement the usual noise caused by riveting machines is eliminated, and yet a perfectly true and properly shaped head is provided.

Having thus described my invention I claim as new and desire to secure by Letters Patent:—

1. In a riveting machine of the class described, a head formed with a tapering socket, a plurality of tapering rollers arranged in the bottom of said socket whereby the rollers may act near the center of said socket, a shank extending from said head, a sleeve surrounding said shank and acting on said head and said shank, and a pressure member connected with said sleeve for providing means for holding the head in an operative position against said rivet.

2. In a riveting device of the character described, a rotatable head, a plurality of converging rollers arranged in said head, each of said rollers being formed with pintles at the end, said head being formed with sockets near the center for accommodating one end of said rollers and a removable journal member arranged at the outer ends of said rollers for supporting said rollers, means connected with said head for rotating the same and means associated with said head for applying pressure thereto.

In testimony whereof I have signed my name to this specification in the presence of two subscribing witnesses.

CHARLEY SNODGRASS.

Witnesses:
MAX E. SOCHA,
EDWARD STUETZ.